Figure 3:
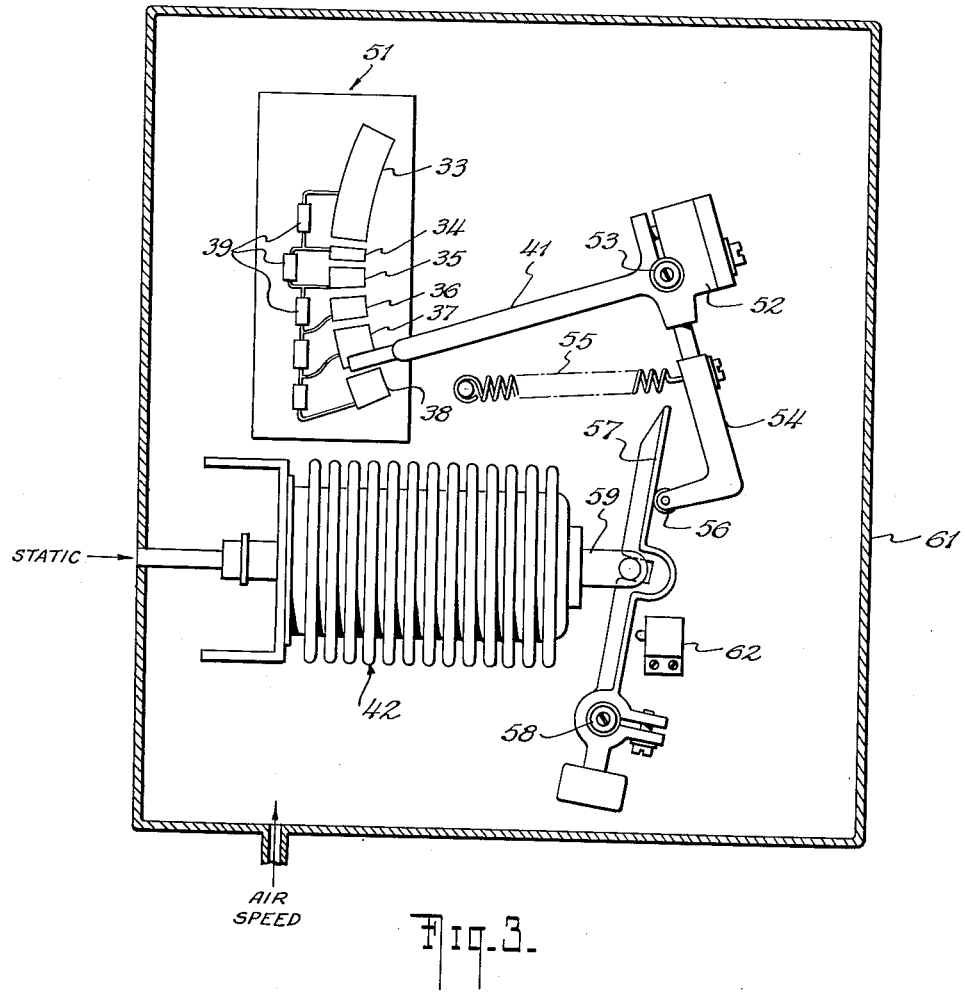

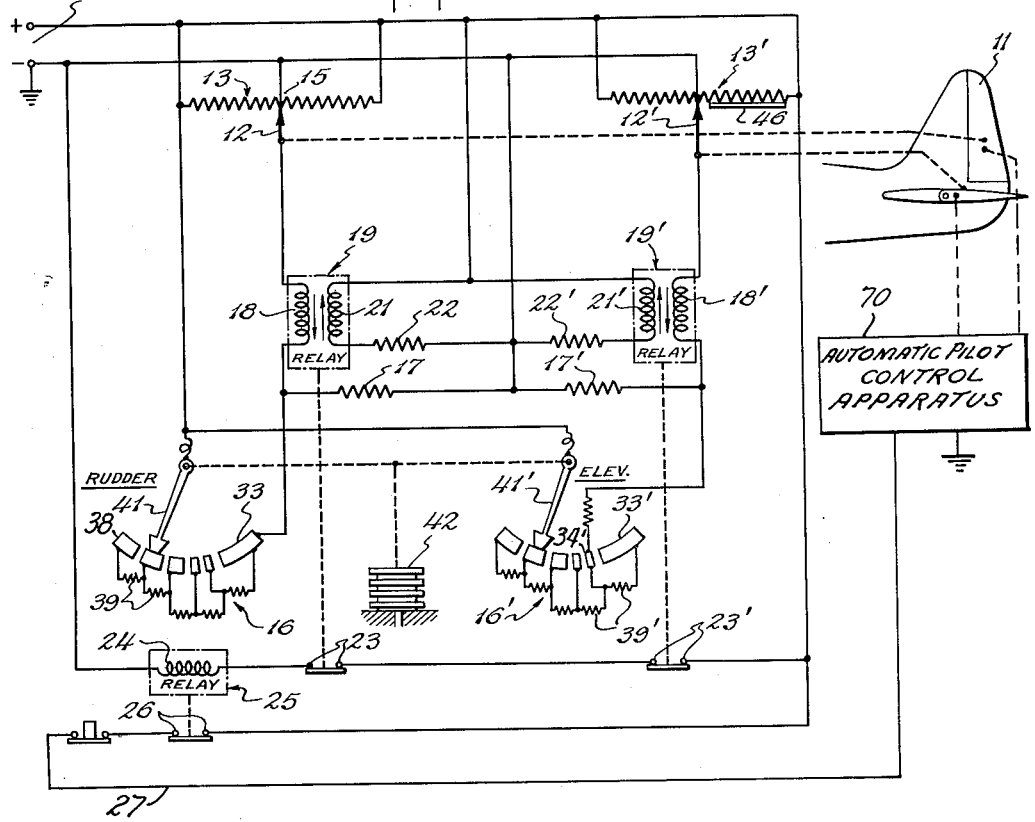
Fig. 1.
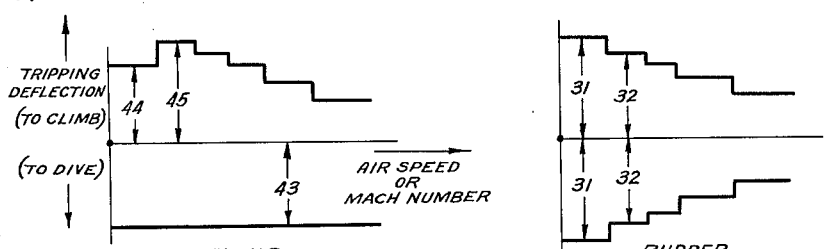
Fig. 2B. ELEVATOR
Fig. 2A. RUDDER
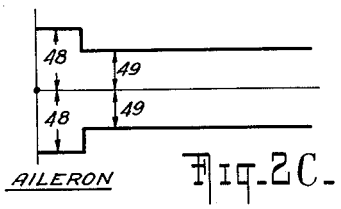
Fig. 2C. AILERON
INVENTOR
FREDERICK A. SUMMERLIN
BY
ATTORNEY Nov. 7, 1961  F. A. SUMMERLIN  3,007,657
AUTOMATIC CONTROL DEVICES FOR AIRCRAFT
Filed May 2, 1958  2 Sheets-Sheet 2

INVENTOR
FREDERICK A. SUMMERLIN
BY
ATTORNEY

United States Patent Office 3,007,657
Patented Nov. 7, 1961

3,007,657
AUTOMATIC CONTROL DEVICES FOR AIRCRAFT
Frederick Arthur Summerlin, Isleworth, England, assignor to The Sperry Gyroscope Company Limited, Brentford, England, a British company
Filed May 2, 1958, Ser. No. 732,745
Claims priority, application Great Britain May 2, 1957
7 Claims. (Cl. 244—77)

This invention relates to automatic control apparatus for aircraft and one object is to reduce the likelihood of the airframe being overstressed or the aircraft being put in a dangerous attitude due to an excessive displacement of one of the control surfaces.

According to the present invention, there is provided aircraft control apparatus, particularly, though not exclusively, air craft automatic control apparatus including: control means for deflecting a control surface of the aircraft so as to vary the aircraft's attitude about an axis; and means operative to produce a characteristic signal when the deflection of the control surface from a neutral position exceeds a limiting deflection for the control surface from its neutral position which limiting deflection is made to depend on airspeed.

The stress on the airframe depends largely upon the turning torque applied to the aircraft, and this increases with airspeed for a given deflection of a control surface, and accordingly the limiting deflection of the control surface should reduce as the airspeed increases. It can be arranged that once components, such as resistors, which do not vary in magnitude during flight have been set, the limiting deflection of a control surface is solely dependent on the measured airspeed. Of course components can be adjustable or replaceable to enable the relationship between the limiting deflection and airspeed to be varied.

When the deflection exceeds the limiting deflection a warning may be given to the pilot, but preferably the automatic control apparatus is rendered inoperative to control the aircraft.

There may be similar means associated with each of the main control surfaces, and the limiting deflection of a second control surface may be different from that of the first at a certain airspeed, although conveniently the airspeed is measured by the same airspeed meter.

During landing approach and low speed conditions it is possible that a deflection of a control surface may not be large enough to overstress the airframe, but may, on the other hand, be large enough to cause a dangerous turning torque on the aircraft at so low a speed and so near the ground, accordingly, the limiting deflection at approach speeds may be smaller than the limiting deflection at a speed in excess of approach speeds.

Where the control surface is an elevator, the limiting deflections upwards may be greater than the limiting deflections downwards for at least some measured airspeeds in the range of operation, because of the asymmetry of the aircraft trim curve.

In a preferred form of the invention the, or each, comparator which comprises a relay having a hold-off coil and a hold-on coil responsive to the difference between electrical signals representing the actual deflection of the control surface and the limiting deflection, has its hold-on coil connected across a diagonal of an electrical bridge which has one or more arms controlled in accordance with the deflection of the control surface, and another arm controlled in accordance with the airspeed.

The invention may be carried into practice in various ways and one embodiment will be described by way of example as applied to apparatus for controlling the control surfaces of an aircraft with reference to the accompanying drawings, of which:

FIGURE 1 is a schematic circuit diagram of the control apparatus;
FIGURE 2 shows the relationship between the limiting deflections of the various control surfaces and the airspeed; and
FIGURE 3 shows the arrangement of the bellows device for giving an output in accordance with the measured airspeed.

Although the apparatus is operative to control ailerons, elevators, and rudder of the aircraft, the arrangements for controlling the ailerons are very similar to those for controlling the rudder and so have not been shown in FIGURE 1 in the interests of simplicity. The arrangements for controlling the rudder will first be described, and then the arrangements for controlling the elevator will be described insofar as they are different.

*Rudder control arrangements*

The rudder 11 is arranged to drive the wiper 12 of a potentiometer 13 which has its two ends connected to the positive side of the D.C. power supply 14, and its centre point 15 connected to the ground. The wiper 12 is arranged to be in line with the centre tap 15 when the rudder is in its neutral position. It will move over one or the other half of the potentiometer winding in accordance with the sense of any deflection of the rudder 11.

The two parts of the half of the potentiometer winding 13 with which the wiper is associated for any deflection of the aircraft, i.e. the two parts on either side of the wiper 12 form two arms of an electrical bridge network of which the other two arms comprise a variable resistor device 16 and a reference resistor 17. The common end of these two resistors 16 and 17 are connected to the wiper 12 through a detector coil 18 of a polarised relay 19, and the outer ends of the resistors 16 and 17 are connected respectively to the positive and the ground of the supply 14.

The resistance of the variable resistor device 16 is arranged to be a function of the airspeed as will be described below, and accordingly the potential across the tripping coil 18 will depend upon the deflection of the rudder 11 and upon the airspeed. If the rudder deflection is great enough, this potential will act to tend to trip the relay 19. The relay also has a hold-off coil 21 which makes the apparatus fail-safe. If the excitation of the coil 18 fails, the system is tripped.

For a given airspeed the relay 19 will be tripped at a certain deflection of the rudder 11 and thus of the wiper 12, and this deflection is called the limiting deflection for the airspeed. As the airspeed increases the limiting deflection is reduced because the resistance of the variable resistor device 16 is increased so that a smaller deflection of the wiper 12 from the zero position 15 is necessary in order to produce sufficient decrease in excitation of the coil 18 to trip the relay 19.

The contacts 23 of the relay 19 are connected across the supply 14 in series with the coil 24 of a slave relay 25 whose contacts 26 are connected in series with the main supply 27 for the automatic pilot control apparatus 70, so that when the relay 19 is tripped, the relay 25 trips also and isolates the control apparatus to render it inoperable to control the aircraft. The pilot will then take over control. It will be appreciated that this will occur if the deflection of the control surface—in this case the rudder 11—exceeds the limiting deflection for the airspeed obtaining at the time.

In accordance with the invention the limiting deflection depends upon the measured airspeed and the desired relationship for the rudder is shown in FIGURE 2A. At lowest airspeeds the limiting deflection in either direction is a maximum (as shown at 31 in FIGURE 2A), while above a certain airspeed the limiting deflection in either direction is reduced (as shown at 32 in FIGURE 2A). At a greater speed the limiting deflection is reduced again in another step, and so on throughout the airspeed range.

This is achieved by appropriate design of the variable resistor device 16 which comprises a printed circuit defining a number of spaced contact segments 33, 34, 35, 36, 37, 38, two only of which are given reference numerals in FIGURE 1, but all of which are shown to a larger scale in FIGURE 3. Across adjacent pairs of these contacts 33 to 38 are connected resistors 39 of appropriate values.

The wiper arm 41 of the resistor device 16 is driven by a bellows device 42 which is responsive to the pitot pressure determined by a pitot tube directed to measure the airspeed.

*Elevator control arrangements*

The elevator control arrangements are quite similar to the arrangements already described for controlling the rudder and similar components are indicated by the same numerals distinguished by a prime. The differences are due to the different characteristic that is desired for limiting the control of the elevator as is shown in FIGURE 2B.

The limiting deflection of the elevator downwards is constant for all airspeeds as shown at 43. The limiting deflection upwards, i.e. the deflection to cause a climb is the same as the limiting deflection downwards for airspeeds up to a certain speed a little in excess of landing speeds, as shown at 44, while for the next speed range the limiting deflection is greater than this (as shown at 45). The limiting deflection then decreases in steps in a manner similar to that already described for the rudder control arrangements.

In order to achieve the constant limiting deflection downwards, that part of the winding of the potentiometer 13' which co-operates with the wiper 12' for deflections greater than those limiting deflection, are covered by an insulating strip 46 which prevents the wiper 12' from making contact with the winding 13' if the deflection exceeds this limit. The hold off coil 18' will then be deenergized and the automatic pilot will be rendered inoperative.

The limiting deflection for the lowest range of airspeeds is made less than the limiting deflection for airspeeds greater than those in this range by connecting the coil 18' through a resistor to the second contact 34' of the variable resistor device 16' instead of to the end contact 33' and by appropriate choice of the values of the resistors 39'.

*Aileron control arrangements*

The aileron control arrangements have not been separately illustrated as they are very similar to those already described for controlling the elevator and rudder. The desired characteristic of aileron operation is as shown in FIGURE 2C. For the lowest range of airspeeds the limiting deflection is a certain deflection 48 in both directions, and for airspeeds in excess of this range the limiting deflection is a lower value 49 in both directions, and this is the limiting deflection throughout the rest of the airspeed range.

Accordingly a single resistor 39 is connected across the first two of the contacts 33 and 34, while the remainder of the contacts are directly connected together.

*General remarks on the operating characteristics*

The rudder characteristic is chosen because there is a maximum rudder deflection which can be safely imposed at a given airspeed without over-stressing the airframe, and this maximum rudder deflection decreases as the airspeed increases because at higher speeds the effect of a small deflection is greater, so that a smaller deflection produces a greater turning torque, and consequently a greater stress on the airframe.

In the case of the elevator where the limiting deflections are asymmetrical due to the asymmetrical nature of the trim curve, it is possible to cater for this by suitable positioning of the tap on the potentiometer and adjustment of padding resistors at the ends of the potentiometer to obtain the desired voltage gradient, or where a trip independent of airspeed is required the potentiometer may be open circuited mechanically at a particular deflection.

In aircraft which are liable to stall at low speeds, the limiting deflection for these speeds may be less than at greater speeds as shown for upward deflections of the elevator in FIGURE 2B.

With the ailerons the danger of overstressing the airframe due to too high a roll torque is not so great as with pitching or yawing torques, and accordingly a single step in the characteristic has been found to be sufficient.

*Control of the resistor device 16 in dependence upon the measured airspeed*

The apparatus for moving the wipers 41 of the variable resistor devices 16 is shown in FIGURE 3. The three resistor devices for the rudder, elevator and aileron control arrangements respectively are stacked in a single unit shown at 51. Only the top resistor device is visible in this figure. The wiper arms 41 are arranged one above the other so that they move together over the segments 33 to 38 of the resistor devices.

The wiper arms 41 form one arm of a bell crank 52 pivoted at 53 whose other arm 54 is urged by a tension spring 55 to turn the bell crank clockwise as shown in FIGURE 3. This movement is prevented by contact of a roller 56 at the free end of the arm 54 against a rocker arm 57 pivoted at 58 and positioned by a rod 59 on the end of the bellows unit 42.

The apparatus so far described is contained within a sealed box 61 which is at pitot pressure, while the interior of the bellows device 42 is at static pressure, so that an increase in airspeed will cause the bellows to contract, with the consequence that the rocker arm 57 will rock in an anticlockwise direction, the bell crank 52 will turn in a clockwise direction, and the wipers 41 will move over the segments of the variable resistor device to adjust the resistances in dependence on the airspeed.

A micro-switch 62 is operated if the airspeed drops below a value lower than landing speed. Should a pitot tube failure occur the bellows will relax to the low speed condition and an indicator is operated by the micro-switch informing the pilot that the control system may be used at a limited indicated airspeed only.

*Summary*

It will be seen that the limiting deflections for the various control surfaces depend only upon the airspeed once the components have been set, that is to say, when the resistor values are fixed and so on.

If it is desired to change the characteristic for any one or more of the control arrangements, for example to allow for changes in elevator trim, this can be easily done by changing certain of the resistors 39 and by re-adjusting resistors at each end of potentiometers 13 so that no major re-design of the equipment is necessary.

Under certain specified conditions the control system may be required to disengage irrespective of the control surface position. If the specified conditions may be made to produce an electrical signal this signal may be fed to the hold-off coil of one of the relays thus overriding any hold-on bias then obtaining and will cause the control system to trip.

Such a case occurs when the stall warning system indicates the proximity of a stall. A voltage produced by the stall warning system is injected through a rectifier into the hold-off coil of the elevator relay 19'.

What is claimed is:

1. Control apparatus for an aircraft having a control surface for varying the attitude of the craft about an axis thereof, said apparatus comprising automatic pilot means for operating said control surface, first variable impedance means responsive to the movement of said control surface for providing a signal having a magnitude representative of the deflection of said control surface from a neutral position, second variable impedance means responsive to the airspeed of said craft for providing a signal dependent upon said airspeed, and summing circuit means responsive to said deflection signal and to said airspeed signal for rendering said automatic pilot means ineffective when the sum of said signals exceeds a predetermined magnitude depending upon airspeed.

2. Control apparatus for an aircraft having a control surface for varying the attitude of the craft about an axis thereof, said apparatus comprising automatic pilot means for operating said control surface, a potentiometer having a first wiper responsive to the movement of said control surface for providing a signal having a magnitude representative of the deflection of said control surface from a neutral position, a variable resistor device having a second wiper responsive to the airspeed of said craft for providing a signal dependent upon said airspeed, a reference resistor, said potentiometer, variable resistor device and reference resistor being interconnected to form an electrical bridge network whereby the two parts of the potentiometer with which the first wiper is associated for any deflection of the control surface form two arms of said bridge network of which the other arms comprise said variable resistor device and said reference resistor, and a relay connected across a diagonal of said bridge network for rendering said automatic pilot means ineffective when the sum of said signals exceeds a predetermined magnitude depending upon airspeed, whereby the potential across said relay is dependent upon the deflection of said control surface and upon the airspeed of said craft.

3. Apparatus of the character described in claim 2 in which said variable resistor device comprises a plurality of spaced contact segments with a limit-defining resistor connected across adjacent pairs of said segments with said second wiper cooperative with said segments whereby each of said limit-defining resistors defines the magnitude of the limiting deflection of the control surface for a particular airspeed range and the extent of said segment defines the extent of the airspeed range over which a particular limiting deflection is controlling.

4. Apparatus of the character defined in claim 2 including means associated with said relay for rendering said automatic pilot means ineffective when the excitation of said relay fails.

5. Control apparatus for an aircraft having a control surface for varying the attitude of the craft about an axis thereof, said apparatus comprising automatic pilot means for operating said control surface, a potentiometer having a first wiper responsive to the movement of said control surface for providing a signal having a magnitude representative of the deflection of said control surface from a neutral position, said potentiometer having its two ends connected to a positive potential source and its center point connected to a negative potential source, said first wiper being disposed adjacent said center tap when said control surface is in the neutral position, a variable resistor device having a second wiper responsive to the airspeed of said craft for providing a signal dependent upon said airspeed, said second wiper being connected to one end of said potentiometer, said device comprising a number of spaced contact segments with a resistor connected across adjacent pairs of said segments, said second wiper being cooperative with said segments, a reference resistor having one of its ends connected to said negative potential source, and a relay responsive to said deflection signal and to said airspeed signal for rendering said automatic pilot means ineffective when the sum of said signals exceeds a predetermined magnitude depending upon airspeed, the common end of said variable resistor device and said reference resistor being connected to said first wiper through said relay.

6. Control apparatus for an aircraft having a control surface for varying the attitude of the craft about an axis thereof, said apparatus comprising automatic pilot means for operating said control surface, means responsive to the movement of said control surface for providing a signal having a magnitude representative of the deflection of said control surface from a neutral position, airspeed responsive means for providing a measure proportional to the airspeed of the craft, and limit setting means responsive to said airspeed measure for defining limiting deflections of said control surface dependent upon said airspeed including means for establishing deflection limits in one direction which are greater than the deflection limits in the other direction for at least a portion of the airspeed range, said limit setting means further including means responsive to said deflection signal for rendering said automatic pilot means ineffective when said deflection limits are exceeded.

7. Control apparatus for an aircraft having a plurality of control surfaces for varying the attitude of a craft about a plurality of axes thereof, said apparatus comprising automatic pilot means for operating said control surfaces, a plurality of potentiometers, each of said potentiometers being responsive to the movement of a particular control surface for providing a signal having a magnitude representative of the deflection of that control surface from a neutral position, an airspeed responsive means for providing a measure representative of the airspeed of the craft, a plurality of variable resistive devices responsive to said airspeed measure for defining limiting deflections for each of said control surfaces dependent upon said airspeed, each of said variable resistor devices comprising a number of spaced conducting segments with a resistor connected between adjacent segments whereby limits may be individually established for each control surface as a function of the resistance of each of said resistors, and a plurality of summing circuit means, each of said summing circuit means being connected to a potentiometer and to a variable resistor device associated with a particular control surface for rendering said automatic pilot means ineffective when the deflection of a control surface exceeds a predetermined magnitude depending upon airspeed.

References Cited in the file of this patent
UNITED STATES PATENTS

| | | |
|---|---|---|
| 2,659,041 | Kutzler | Nov. 10, 1953 |
| 2,770,428 | Vogel | Nov. 13, 1956 |
| 2,773,252 | Noxon et al. | Dec. 4, 1956 |
| 2,859,005 | Owen et al. | Nov. 4, 1958 |
| 2,863,622 | Ciscel | Dec. 9, 1958 |
| 2,869,063 | Hess | Jan. 13, 1959 |